UNITED STATES PATENT OFFICE.

LUDWIG BEREND, OF CREFELD, GERMANY, ASSIGNOR TO COMMERCIAL PRODUCTS COMPANY, LIMITED, OF LONDON, ENGLAND.

PRODUCTION OF PLASTIC AND ELASTIC SUBSTANCES.

952,724.

Specification of Letters Patent. Patented Mar. 22, 1910.

No Drawing.

Application filed April 16, 1909. Serial No. 490,401.

*To all whom it may concern:*

Be it known that I, LUDWIG BEREND, Ph. D., a subject of the King of Prussia, residing at Crefeld, Germany, have invented certain new and useful Improvements in the Production of Plastic and Elastic Substances, of which the following is a specification.

This invention relates to the production of plastic and elastic substances.

Various methods have been proposed for utilizing the action of formaldehyde upon glue, but as water was used as a solvent, the ultimate product still contained water.

In a process for the production of a plastic and elastic substance by the action of formaldehyde upon glue according to this invention, neither the glue nor the formaldehyde is dissolved in water.

Thus a feature of this invention consists in dissolving the glue with or without casein, or albumen in phenol or in commercial dehydrated glycerin or both, or other similar non-aqueous solvents.

Another feature of this invention consists in using the formaldehyde in anhydrous form, for example solid as paraformaldehyde, or in the form of anhydrous solution of formaldehyde in dehydrated glycerin.

A further feature of this invention is the employment in emulsion with the glue of a new form of celluloid in which the camphor can be replaced by anhydroformaldehydeanilin or anhydroformaldehydeanilin resinate.

One process of producing a plastic and elastic substance according to this invention consists in preparing an emulsion from a solution of glue with or without casein or albumen alone or together, in phenol or in dehydrated glycerin or both, with anilin or anilin and shellac (or other resin acid) alone or in combination with nitrocellulose or acetylcellulose with or without camphor and thereafter treating the emulsion with formaldehyde in an anhydrous form, for example by mixing the emulsion with solid paraformaldehyde, or by agitating the emulsion with glycerin formaldehyde as free from water as possible. The reaction of the shellac or other resin acid upon the anilin is to form a compound, an anilin resinate, which subsequently reacts with the formaldehyde to produce anhydroformaldehyde resinate and this resinate replaces camphor and forms with nitrocellulose or acetylcellulose a kind of celluloid.

The following is a description of one method of carrying this invention into practical effect:—Two liquids are first prepared separately, hereinafter referred to as preparations "A" and "B".

Preparation "A" is prepared as follows:— 150 grams of glue are dissolved in 75 grams of phenol and 75 grams of commercial dehydrated glycerin say at a temperature of 70° to 80° C. yielding 300 grams of solution.

Preparation "B" can be prepared in one of the following ways:—

1. 20 grams of shellac, 10 grams of dinitrocellulose or acetylcellulose and 5 grams of camphor are dissolved in 48 grms. of anilin oil and the solution is heated until a sample on cooling yields a mass of transparent and homogeneous appearance.

2. 20 grams of shellac and 10 grams of dinitrocellulose are dissolved in 20 grams of anilin and the solution is heated with 12 grams of paraformaldehyde until a sample on cooling yields a mass of transparent and homogeneous appearance. This solution is mixed with 28 grams of anilin.

3. 20 grams of shellac are dissolved in 20 grams of anilin and the solution is mixed with 20 grams of anilin.

4. 20 grams of shellac are dissolved in 20 grams of alinin and the solution is heated with 16 grams of paraformaldehyde until the mass is homogeneous, then the solution is mixed with 28 grams of anilin.

To produce the finished product 300 parts by weight of preparation "A" are mixed with such a quantity of preparation "B" as contains by weight say 48 parts of anilin, both solutions being at about 70° C. Finally 80 grams of glycerin-formaldehyde (containing about 30 grams of formaldehyde) or 30 grams of paraformaldehyde are quickly stirred into the mixture of solution "A" and solution $B^1$ or $B^3$ or 48 grams of glycerin-formaldehyde or 18 grams of solid paraformaldehyde are stirred into the mixture of solution "A" or $B^2$ and $B^4$. The mixture becomes homogeneous and tough and before solidifying is molded. The density of the finished product can be increased by molding the mixture under pressure.

The relative proportions of the ingredients may be considerably varied but it is important that sufficient formaldehyde should be added to combine with the glue and with the anilin compound as described.

What I claim as my invention and desire to secure by Letters Patent is:—

1. The hereindescribed process for the production of a plastic and elastic substance which consists in dissolving glue in phenol and treating the solution with formaldehyde in an anhydrous form.

2. The hereindescribed process for the production of a plastic and elastic substance which consists in dissolving glue in phenol and dehydrated glycerin and treating the solution with formaldehyde in an anhydrous form.

3. The hereindescribed process for the production of a plastic and elastic substance which consists in dissolving glue in phenol, mixing and emulsifying with anilin and treating the emulsion with anhydrous formaldehyde.

4. The hereindescribed process for the production of a plastic and elastic substance which consists in dissolving glue in phenol, mixing and emulsifying with anilin and resin acid (such as shellac) and treating the emulsion with anhydrous formaldehyde.

5. The hereindescribed process for the production of a plastic and elastic substance which consists in dissolving glue in phenol, mixing and emulsifying with anilin and resin acid (such as shellac) with soluble cellulose and treating the emulsion with anhydrous formaldehyde.

6. The hereindescribed process for the production of a plastic and elastic substance which consists in dissolving glue in phenol, mixing and emulsifying with anilin and resin acid (such as shellac) with nitrocellulose and treating the emulsion with anhydrous formaldehyde.

7. The hereindescribed process for the production of a plastic and elastic substance which consists in dissolving glue in phenol, mixing and emulsifying with anilin and resin acid (such as shellac) with nitrocellulose and camphor and treating the emulsion with anhydrous formaldehyde.

8. The hereindescribed composition of matter consisting of a homogeneous mixture of nitrocellulose with anhydroformaldehydeanilin.

9. The hereindescribed composition of matter which consists of a homogeneous mixture of nitrocellulose with anhydroformaldehydeanilin resinate.

In testimony whereof I have signed my name to this specification in the presence of two subscribing witnesses.

LUDWIG BEREND.

Witnesses:
HENRY QUADFLIEG,
ELIRE KALBURSH.